United States Patent
Guan

(10) Patent No.: US 11,303,396 B2
(45) Date of Patent: Apr. 12, 2022

(54) FEEDBACK INFORMATION SENDING METHOD AND DEVICE

(71) Applicant: HUAWEI TECHNOLOGIES CO., LTD., Guangdong (CN)

(72) Inventor: Lei Guan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 203 days.

(21) Appl. No.: 16/579,441

(22) Filed: Sep. 23, 2019

(65) Prior Publication Data

US 2020/0021401 A1    Jan. 16, 2020

Related U.S. Application Data

(63) Continuation of application No. PCT/CN2018/078715, filed on Mar. 12, 2018.

(30) Foreign Application Priority Data

Mar. 23, 2017  (CN) .......................... 201710179901.5

(51) Int. Cl.
*H04W 72/04*     (2009.01)
*H04L 1/18*     (2006.01)
(Continued)

(52) U.S. Cl.
CPC ............ *H04L 1/189* (2013.01); *H04L 1/1621* (2013.01); *H04L 1/1896* (2013.01); *H04L 5/0055* (2013.01); *H04W 72/0446* (2013.01)

(58) Field of Classification Search
CPC ...... H04L 1/189; H04L 1/1621; H04L 1/1896
See application file for complete search history.

(56) References Cited

U.S. PATENT DOCUMENTS

| 8,942,166 B2* | 1/2015 | Narasimha | H04W 74/006 370/328 |
| 2009/0313516 A1* | 12/2009 | Shin | H04L 1/0009 714/748 |

(Continued)

FOREIGN PATENT DOCUMENTS

| CN | 101615986 A | 12/2009 |
| CN | 101222304 B | 2/2013 |

(Continued)

OTHER PUBLICATIONS

Office Action in Indian Application No. 201917041615, dated Mar. 2, 2021, 7 pages.

(Continued)

*Primary Examiner* — Parth Patel
(74) *Attorney, Agent, or Firm* — Fish & Richardson P.C.

(57) ABSTRACT

A feedback information sending method and device are disclosed. In one embodiment, a method includes: receiving, by a terminal device during a first time period, a transport block (TB) from a network device, wherein the TB comprises a plurality of code block groups (CBGs); determining, by the terminal device, that the plurality of CBGs include one or more CBGs that are correctly decoded and one or more CBGs that are incorrectly decoded; receiving, by the terminal device during a second time period after the first time period, one or more retransmissions comprising the one or more CBGs that are incorrectly decoded and absent the one or more CBGs that are correctly decoded; and sending, by the terminal device during a third time period after the second time period, first one or more decoding statuses corresponding to one or more CBGs that are correctly decoded and second one or more decoding statuses corresponding to one or more retransmissions.

7 Claims, 8 Drawing Sheets

(51) Int. Cl.
*H04L 1/16* (2006.01)
*H04L 5/00* (2006.01)

(56) References Cited

U.S. PATENT DOCUMENTS

| | | | | |
|---|---|---|---|---|
| 2012/0002657 | A1* | 1/2012 | Seyama | H04L 1/1628 370/338 |
| 2013/0114474 | A1* | 5/2013 | Fu | H04L 1/1635 370/280 |
| 2016/0065343 | A1* | 3/2016 | Kim | H04W 76/20 370/329 |
| 2017/0026297 | A1* | 1/2017 | Sun | H04B 7/0623 |
| 2017/0126378 | A1* | 5/2017 | Luo | H04L 1/0071 |
| 2017/0303284 | A1* | 10/2017 | Xu | H04L 1/0026 |
| 2018/0262303 | A1* | 9/2018 | Jia | H03M 13/2906 |
| 2018/0270705 | A1* | 9/2018 | Sun | H04W 28/06 |
| 2019/0149273 | A1* | 5/2019 | Golitschek Edler von Elbwart | H04W 52/48 714/748 |
| 2019/0334664 | A1* | 10/2019 | Guan | H04L 5/0055 |
| 2019/0349174 | A1* | 11/2019 | Guan | H04L 1/1864 |
| 2019/0364546 | A1* | 11/2019 | Kwak | H04W 72/042 |
| 2020/0021401 | A1* | 1/2020 | Guan | H04L 1/1614 |
| 2020/0076543 | A1* | 3/2020 | Yeo | H04L 1/1896 |
| 2020/0112398 | A1* | 4/2020 | Takeda | H04L 5/0055 |
| 2020/0112403 | A1* | 4/2020 | Liu | H04L 5/0055 |
| 2020/0170033 | A1* | 5/2020 | Gao | H04W 72/1289 |
| 2020/0295873 | A1* | 9/2020 | Jayasinghe | H04L 1/1614 |
| 2020/0366444 | A1* | 11/2020 | Yang | H04L 1/1854 |

FOREIGN PATENT DOCUMENTS

| | | |
|---|---|---|
| CN | 103095432 A | 5/2013 |
| CN | 101667900 B | 11/2014 |
| CN | 104301077 A | 1/2015 |
| CN | 105191176 A | 12/2015 |
| CN | 105515733 A | 4/2016 |
| CN | 107645369 A | 1/2018 |
| EP | 3499771 A1 | 6/2019 |
| EP | 3609226 A1 | 2/2020 |
| EP | 3621228 A1 | 3/2020 |
| EP | 3641183 A1 | 4/2020 |
| JP | 2010147755 * | 7/2010 ............ H04L 1/189 |
| JP | 2010147755 A | 7/2010 |
| KR | 101606503 B1 | 3/2016 |
| WO | 2016126330 A1 | 8/2016 |
| WO | 2016149214 A1 | 9/2016 |
| WO | 2017019193 A1 | 2/2017 |

OTHER PUBLICATIONS

Extended European Search Report issued in European Application No. 18771451.4 dated Dec. 18, 2020, 12 pages.
Nokia et al., "Multi-bit feedback for NR HARQ operation," 3GPP TSG-RAN WG1 Meeting #88, R1-1703325, Athens, Greece, Feb. 13-17, 2017, 5 pages.
Office Action issued in Japanese Application No. 2019-552054 dated Dec. 14, 2020, 8 pages (with English translation).
Samsung et al.,"WF on CB or CB-group based retransmission",3GPP TSG RAN1#88, R1-1703740, Athens, Greece, Feb. 13-17, 2017, 3 pages.
Office Action issued in Chinese Application No. 201880019313.8 dated Mar. 17, 2020, 13 pages (With English translation).
PCT International Search Report and Written Opinion in International Application No. PCT/CN2018/078,715, dated May 18, 2018, 21 pages (With English Translation).
Office Action issued in Japanese Application No. 2019-552054 dated Jul. 12, 2021, 6 pages (with English translation).

* cited by examiner

300

| A second device receives a first TB from a first device, where the first TB includes a plurality of CBGs, the plurality of CBGs include a first CBG and a second CBG that are received by the second device in a first time unit, the first CBG received in the first time unit is a CBG that is successfully decoded, and the second CBG received in the first time unit is a CBG that is unsuccessfully decoded | — S310 |

| The second device generates a first feedback information set, where the first feedback information set includes first feedback information and second feedback information, the first feedback information is used to feed back a decoding status of the first CBG between the first time unit and a second time unit, the second feedback information is used to feed back a decoding status of the second CBG after the second time unit, the second time unit is a time unit in which the second device receives the second CBG after the first time unit, and the second device does not receive the first CBG in the second time unit | — S320 |

| The second device sends the first feedback information set to the first device in a third time unit | — S330 |

| A second device receives a first TB from a first device, where the first TB includes a plurality of CBGs | — S410 |

| The second device separately decodes the plurality of CBGs | — S420 |

| The second device sends a third feedback information set to the first device, where the third feedback information set includes a plurality of NACKs that have a one-to-one correspondence with the plurality of CBGs, and the third feedback information set is used to indicate that the plurality of CBGs are successfully checked and the first TB is unsuccessfully checked | — S430 |

```
A first device sends a first TB to a second device in a fifth time unit, where
the first TB includes a plurality of CBGs, the plurality of CBGs include a
second CBG that is sent by the first device to the second device in a sixth
time unit, the plurality of CBGs further include a first CBG that is not sent
by the first device in the sixth time unit, the first CBG is a CBG that is
determined by the first device based on feedback information received
between the fifth time unit and the sixth time unit and that is successfully
decoded by the second device, the second CBG is a CBG that is
determined by the first device based on the feedback information received
between the fifth time unit and the sixth time unit and that is
unsuccessfully decoded by the second device, and the sixth time unit is
after the fifth time unit
```
— S510

The first device receives a first feedback information set from the second device in a seventh time unit, where the first feedback information set includes first feedback information and second feedback information, the first feedback information is used to feed back a decoding status of the first CBG between the fifth time unit and the sixth time unit, the second feedback information is used to feed back a decoding status of the second CBG after the sixth time unit, and the seventh time unit is after the sixth time unit — S520

The first device determines, based on the first feedback information set, whether to retransmit the first TB — S530

FIG. 5

FEEDBACK INFORMATION SENDING METHOD AND DEVICE

CROSS-REFERENCE TO RELATED APPLICATIONS

This application is a continuation of International Application No. PCT/CN2018/078715, filed on Mar. 12, 2018, which claims priority to Chinese Patent Application No. 201710179901.5, filed on Mar. 23, 2017. The disclosures of the aforementioned applications are hereby incorporated by reference in their entireties.

TECHNICAL FIELD

This application relates to the wireless communications field, and in particular, to a feedback information sending method and device.

BACKGROUND

In a wireless communications system, to reduce coding and decoding complexity, a transport block (transport block, TB) is divided into a plurality of code blocks (code block, CB), and each CB has an independent check function. In addition, each TB also has an independent check function. After each CB in a TB is successfully checked, a receiving device further needs to check the TB, to identify a false alarm (namely, a case in which some CBs are decoded incorrectly but pass the check) in a timely manner and reduce a retransmission latency.

A 5th-generation (5th-Generation, 5G) communications system poses a requirement of supporting an ultra-reliable and low-latency communications (ultra-reliable and low-latency communication, URLLC) service. In a URLLC scenario, it is usually required that a transmission latency over a wireless air interface is within 1 ms and transmission reliability reaches 99.999%. In addition, a strict requirement is posed for a data transmission latency.

To meet a data transmission requirement in the URLLC scenario, a sending device preferentially sends data with a relatively high priority, for example, punctures TBs that have started to be transmitted (that is, overwrites data that has been generated), or sends both the data with a relatively high priority and TBs that have been generated. Consequently, some or all CBs in these TBs are highly probable to be unsuccessfully decoded, and a transmit end needs to retransmit the CBs that are unsuccessfully decoded.

Therefore, how to determine an unsuccessfully decoded CB in a TB to improve retransmission efficiency is an urgent problem to be resolved currently.

SUMMARY

In view of this, this application provides a feedback information sending method and device and a feedback information receiving method and device, to determine a CB that is unsuccessfully decoded in a TB, and to improve retransmission efficiency.

According to an aspect, a feedback information sending method is provided, including:

receiving, by a second device, a first transport block TB from a first device, where the first TB includes a plurality of code block groups CBGs, the plurality of CBGs include a first CBG and a second CBG that are received by the second device in a first time unit, the first CBG received in the first time unit is a CBG that is successfully decoded, and the second CBG received in the first time unit is a CBG that is unsuccessfully decoded;

generating, by the second device, a first feedback information set, where the first feedback information set includes first feedback information and second feedback information, the first feedback information is used to feed back a decoding status of the first CBG between the first time unit and a second time unit, the second feedback information is used to feed back a decoding status of the second CBG after the second time unit, the second time unit is a time unit in which the second device receives the second CBG after the first time unit, and the second device does not receive the first CBG in the second time unit; and sending, by the second device, the first feedback information set to the first device in a third time unit.

According to the feedback information sending method provided in this application, a device that transmits a TB can identify a false alarm and a non-false alarm, thereby improving retransmission efficiency.

Optionally, the first feedback information includes at least one negative acknowledgement NACK, and the first feedback information is used to indicate that the first TB is unsuccessfully checked and each of the plurality of CBGs is successfully checked.

In this way, a device that transmits a TB can identify a false alarm and a non-false alarm, thereby improving retransmission efficiency.

Optionally, the at least one NACK has a one-to-one correspondence with the first CBG In this way, a device that transmits a TB can identify a false alarm and a non-false alarm, thereby improving retransmission efficiency.

Optionally, the first feedback information includes a positive acknowledgement ACK that has a one-to-one correspondence with the first CBG; and the second CBG is unsuccessfully decoded between the second time unit and the third time unit; or the second CBG is successfully decoded between the second time unit and the third time unit, and the first TB is successfully checked.

Optionally, the first feedback information set includes a plurality of ACKs that have a one-to-one correspondence with the plurality of CBGs, the first TB corresponds to a first transmission process, and the method further includes:

receiving, by the second device, collection information from the first device, where the collection information is used to instruct the second device to report feedback information of a CBG corresponding to at least one transmission process, and the at least one transmission process includes the first transmission process; and sending, by the second device, a second feedback information set corresponding to the first transmission process to the first device in a fourth time unit, where the second feedback information set includes a plurality of NACKs that have a one-to-one correspondence with the plurality of CBGs, and the second device does not receive, between the third time unit and the fourth time unit, a CBG corresponding to the first transmission process.

According to the feedback information sending method provided in this application, when a receive end does not receive the CBG corresponding to the first transmission process, but receives the collection information for requiring feedback of the first transmission process, the receive end may feed back a plurality of NACKs, to avoid a data transmission error, and avoid a loss of a physical layer data packet caused due to that the receive end has missed detection of a control channel of the first transmission process but reports an ACK.

According to another aspect, a feedback information sending method is provided, including: receiving, by a second device, a first transport block TB from a first device, where the first TB includes a plurality of code block groups CBGs;

decoding, by the second device, each of the plurality of CBGs; and sending, by the second device, a third feedback information set to the first device, where the third feedback information set includes a plurality of negative acknowledgements NACKs that have a one-to-one correspondence with the plurality of CBGs, and the third feedback information set is used to indicate that the plurality of CBGs are successfully checked and the first TB is unsuccessfully checked.

According to the feedback information sending method provided in this application, a device that transmits a TB can identify a false alarm and a non-false alarm, thereby improving retransmission efficiency.

Optionally, the method further includes:

receiving, by the second device, the plurality of CBGs from the first device in a first time unit, where the plurality of CBGs include a first CBG and a second CBG, the first CBG received in the first time unit is a CBG that is successfully decoded, and the second CBG received in the first time unit is a CBG that is unsuccessfully decoded;

receiving, by the second device, the second CBG from the first device in a second time unit, where the second device does not receive the first CBG in the second time unit;

generating, by the second device, a first feedback information set, where the first feedback information set includes first feedback information and second feedback information, the first feedback information is used to feed back a decoding status of the first CBG between the first time unit and the second time unit, and the second feedback information is used to feed back a decoding status of the second CBG after the second time unit; and sending, by the second device, the first feedback information set to the first device in a third time unit.

According to the feedback information sending method provided in this application, a device that transmits a TB can identify a false alarm and a non-false alarm, thereby improving retransmission efficiency.

Optionally, the first feedback information includes at least one NACK, and the first feedback information is used to indicate that the first TB is unsuccessfully checked and each of the plurality of CBGs is successfully checked.

In this way, a device that transmits a TB can identify a false alarm and a non-false alarm, thereby improving retransmission efficiency.

Optionally, the at least one NACK has a one-to-one correspondence with the first CBG Optionally, the first feedback information includes a positive acknowledgement ACK that has a one-to-one correspondence with the first CBG; and the second CBG is unsuccessfully decoded between the second time unit and the third time unit; or the second CBG is successfully decoded between the second time unit and the third time unit, and the first TB is successfully checked.

Optionally, the first feedback information set includes a plurality of ACKs that have a one-to-one correspondence with the plurality of CBGs, the first TB corresponds to a first transmission process, and the method further includes:

receiving, by the second device, collection information from the first device, where the collection information is used to instruct the second device to report feedback information of a CBG corresponding to at least one transmission process, and the at least one transmission process includes the first transmission process; and sending, by the second device, a second feedback information set corresponding to the first transmission process to the first device in a fourth time unit, where the second feedback information set includes a plurality of NACKs that have a one-to-one correspondence with the plurality of CBGs, and the second device does not receive, between the third time unit and the fourth time unit, a CBG corresponding to the first transmission process.

According to the feedback information sending method provided in this application, when a receive end does not receive the CBG corresponding to the first transmission process, but receives the collection information for requiring feedback of the first transmission process, the receive end may feed back a plurality of NACKs, to avoid a data transmission error, and avoid a loss of a physical layer data packet caused due to that the receive end has missed detection of a control channel of the first transmission process but reports an ACK.

According to still another aspect, a feedback information receiving method is provided, including:

sending, by a first device, a first transport block TB to a second device in a fifth time unit, where the first TB includes a plurality of code block groups CBGs, the plurality of CBGs include a second CBG that is sent by the first device to the second device in a sixth time unit, the plurality of CBGs further include a first CBG that is not sent by the first device in the sixth time unit, the first CBG is a CBG that is determined by the first device based on feedback information received between the fifth time unit and the sixth time unit and that is successfully decoded by the second device, the second CBG is a CBG that is determined by the first device based on the feedback information received between the fifth time unit and the sixth time unit and that is unsuccessfully decoded by the second device, and the sixth time unit is after the fifth time unit;

receiving, by the first device, a first feedback information set from the second device in a seventh time unit, where the first feedback information set includes first feedback information and second feedback information, the first feedback information is used to feed back a decoding status of the first CBG between the fifth time unit and the sixth time unit, the second feedback information is used to feed back a decoding status of the second CBG after the sixth time unit, and the seventh time unit is after the sixth time unit; and determining, by the first device based on the first feedback information set, whether to retransmit the first TB.

According to the feedback information receiving method provided in this application, a device that transmits a TB can identify a false alarm and a non-false alarm, thereby improving retransmission efficiency.

Optionally, the first feedback information includes at least one negative acknowledgement NACK, and the first feedback information is used to indicate that the first TB is unsuccessfully checked and each of the plurality of CBGs is successfully checked.

In this way, a device that transmits a TB can identify a false alarm and a non-false alarm, thereby improving retransmission efficiency.

Optionally, the at least one NACK has a one-to-one correspondence with the first CBG In this way, a device that transmits a TB can identify a false alarm and a non-false alarm, thereby improving retransmission efficiency.

Optionally, the first feedback information includes a positive acknowledgement ACK that has a one-to-one correspondence with the first CBG; and the second CBG is unsuccessfully decoded between the second time unit and the third time unit; or the second CBG is successfully decoded between the second time unit and the third time unit, and the first TB is successfully checked.

Optionally, the first feedback information set includes a plurality of ACKs that have a one-to-one correspondence with the plurality of CBGs, the first TB corresponds to a first transmission process, and the method further includes:

sending, by the first device, a second TB to the second device, where the second TB includes at least one CBG, and the second TB corresponds to a second transmission process;

sending, by the first device, collection information to the second device, where the collection information is used to instruct the second device to report feedback information of CBGs corresponding to at least two transmission processes, and the at least two transmission processes include the first transmission process and the second transmission process; and receiving, by the first device from the second device in an eighth time unit, a second feedback information set corresponding to the first transmission process, where the second feedback information set includes a plurality of NACKs that have a one-to-one correspondence with the plurality of CBGs, and the first device does not schedule, for the second device between the seventh time unit and the eighth time unit, a CBG corresponding to the first transmission process.

According to the feedback information receiving method provided in this application, when a receive end does not receive the CBG corresponding to the first transmission process, but receives the collection information for requiring feedback of the first transmission process, the receive end may feed back a plurality of NACKs, to avoid a data transmission error, and avoid a loss of a physical layer data packet caused due to that the receive end has missed detection of a control channel of the first transmission process but reports an ACK.

According to yet another aspect, a feedback information receiving method is provided, including:

sending, by a first device, a first transport block TB to a second device, where the first TB includes a plurality of code block groups CBGs;

receiving, by the first device, a third feedback information set from the second device, where the third feedback information set includes a plurality of negative acknowledgements NACKs that have a one-to-one correspondence with the plurality of CBGs; and determining, by the first device based on the third feedback information set, that the plurality of CBGs are successfully checked and the first TB is unsuccessfully checked.

According to the feedback information sending method provided in this application, a device that transmits a TB can identify a false alarm and a non-false alarm, thereby improving retransmission efficiency.

Optionally, the method further includes:

sending, by the first device, the plurality of CBGs to the second device in a fifth time unit;

sending, by the first device, a second CBG to the second device in a sixth time unit, where the second CBG belongs to the plurality of CBGs, and the second CBG is a CBG that is determined by the first device based on feedback information received between the fifth time unit and the sixth time unit and that is unsuccessfully decoded by the second device; the plurality of CBGs further include a first CBG, and the first CBG is a CBG that is determined by the first device based on the feedback information received between the fifth time unit and the sixth time unit and that is successfully decoded by the second device; and the first device does not send the first CBG in the sixth time unit; and receiving, by the first device, a first feedback information set from the second device in a seventh time unit, where the first feedback information set includes first feedback information and second feedback information, the first feedback information is used to feed back a decoding status of the first CBG between the fifth time unit and the sixth time unit, and the second feedback information is used to feed back a decoding status of the second CBG between the sixth time unit and the seventh time unit.

According to the feedback information sending method provided in this application, a device that transmits a TB can identify a false alarm and a non-false alarm, thereby improving retransmission efficiency.

Optionally, the first feedback information includes at least one NACK, and the first feedback information is used to indicate that the first TB is unsuccessfully checked and each of the plurality of CBGs is successfully checked.

In this way, a device that transmits a TB can identify a false alarm and a non-false alarm, thereby improving retransmission efficiency.

Optionally, the at least one NACK has a one-to-one correspondence with the first CBG In this way, a device that transmits a TB can identify a false alarm and a non-false alarm, thereby improving retransmission efficiency.

Optionally, the first feedback information includes an ACK that has a one-to-one correspondence with the first CBG; and the second CBG is unsuccessfully decoded between the second time unit and the third time unit; or the second CBG is successfully decoded between the second time unit and the third time unit, and the first TB is successfully checked.

Optionally, the first feedback information set includes a plurality of positive acknowledgements ACKs that have a one-to-one correspondence with the plurality of CBGs, the first TB corresponds to a first transmission process, and the method further includes:

sending, by the first device, a second TB to the second device, where the second TB includes at least one CBG, and the second TB corresponds to a second transmission process;

sending, by the first device, collection information to the second device, where the collection information is used to instruct the second device to report feedback information of CBGs corresponding to at least two transmission processes, and the at least two transmission processes include the first transmission process and the second transmission process; and receiving, by the first device from the second device in an eighth time unit, a second feedback information set corresponding to the first transmission process, where the second feedback information set includes a plurality of NACKs that have a one-to-one correspondence with the plurality of CBGs, and the first device does not schedule, for the second device between the seventh time unit and the eighth time unit, a CBG corresponding to the first transmission process.

According to the feedback information receiving method provided in this application, when a receive end does not receive the CBG corresponding to the first transmission process, but receives the collection information for requiring feedback of the first transmission process, the receive end may feed back a plurality of NACKs, to avoid a data transmission error, and avoid a loss of a physical layer data packet caused due to that the receive end has missed detection of a control channel of the first transmission process but reports an ACK.

According to still yet another aspect, this application provides a feedback information sending device. The device may implement functions performed by the second device in the methods of the foregoing aspects. The functions may be implemented by hardware, or may be implemented by hardware by executing corresponding software. The hardware or the software includes one or more units or modules corresponding to the foregoing functions.

In a possible design, a structure of the device includes a processor and a transceiver, and the processor is configured to support the device in performing corresponding functions in the foregoing methods. The transceiver is configured to support communication between the device and another network element. The device may further include a memory. The memory is configured to: be coupled to the processor, and store a program instruction and data that are necessary for the device.

According to a further aspect, this application provides a feedback information receiving device. The device may implement functions performed by the first device in the methods of the foregoing aspects. The functions may be implemented by hardware, or may be implemented by hardware by executing corresponding software. The hardware or the software includes one or more units or modules corresponding to the foregoing functions.

In a possible design, a structure of the device includes a processor and a transceiver, and the processor is configured to support the device in performing corresponding functions in the foregoing methods. The transceiver is configured to support communication between the device and another network element. The device may further include a memory. The memory is configured to: be coupled to the processor, and store a program instruction and data that are necessary for the device.

According to a still further aspect, a computer program product is provided. The computer program product includes computer program code. When the computer program code is executed by a communications unit, a processing unit, a transceiver, or a processor of a terminal device, a second device performs the methods in the foregoing implementations.

According to a yet further aspect, a computer program product is provided. The computer program product includes computer program code. When the computer program code is executed by a communications unit, a processing unit, a transceiver, or a processor of a terminal device, a first device performs the methods in the foregoing implementations.

According to a still yet further aspect, this application provides a computer storage medium, configured to store a computer software instruction used by the second device. The computer software instruction includes a program designed for performing the foregoing aspects.

According to even yet another aspect, this application provides a computer storage medium, configured to store a computer software instruction used by the first device. The computer software instruction includes a program designed for performing the foregoing aspects.

BRIEF DESCRIPTION OF DRAWINGS

FIG. 3 is a schematic flowchart of a feedback information sending method according to this application;

FIG. 4 is a schematic flowchart of another feedback information sending method according to this application;

FIG. 5 is a schematic flowchart of a feedback information receiving method according to this application;

DESCRIPTION OF EMBODIMENTS

The following describes the technical solutions of this application with reference to the accompanying drawings.

Figure 1:
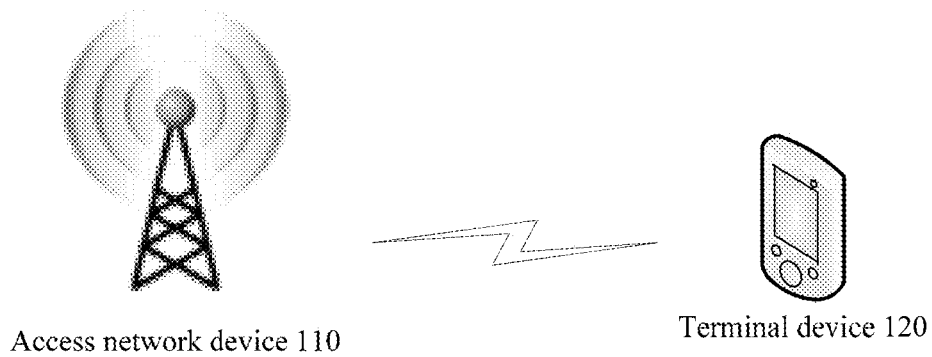
FIG. 1 is a schematic architectural diagram of a communications system applicable to this application.

FIG. 1 shows a communications system 100 applicable to this application. The communications system 100 includes an access network device 110 and a terminal device 120. The access network device 110 communicates with the terminal device 120 by using a wireless network. When the terminal device 120 sends data, a wireless communications module may encode information for transmission. Specifically, the wireless communications module may obtain a particular quantity of data bits to be sent to the access network device 110 through a channel. These data bits are, for example, data bits generated by a processing module, received from another device, or stored in a storage module. These data bits may be included in one or more transport blocks (or may be referred to as information blocks or data blocks), and a transport block may be segmented to generate a plurality of code blocks.

The terminal device in this application may be referred to as an access terminal, user equipment (user equipment, UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a handheld device or a computing device that has a wireless communication function, or another processing device, an in-vehicle device, a wearable device connected to a wireless modem, or user equipment in a 5G communications system.

The access network device may be a base transceiver station (base transceiver station, BTS) in a code division multiple access (code division multiple access, CDMA) system, may be a NodeB (node B, NB) in a wideband code division multiple access (wideband code division multiple access, WCDMA) system, may be an evolved NodeB (evolutional node B, eNB) in a long term evolution (long term evolution, LTE) system, or may be a gNodeB (gNB) in a 5G communications system. The foregoing base stations are merely used as an example for description, and the access network device may alternatively be a relay station, an access point, an in-vehicle device, a wearable device, or another type of device.

The foregoing communications system applicable to this application is merely used as an example for description, and a communications system applicable to this application is not limited thereto. For example, the communications system may include another quantity of access network devices and another quantity of terminal devices.

To help understand this application, before a feedback information sending method provided in this application is described, concepts related to this application are briefly described first.

In this application, a TB may be divided into one or more CBGs, and each CBG includes at least one CB. For example, a quantity of CBGs obtained through division of a TB may be determined based on a quantity of bits of the TB, or may be determined based on time domain resources and/or frequency domain resources occupied by the TB, or may be directly configured by using higher layer signaling.

CBs in a TB may be mapped onto time-frequency resources according to a predetermined mapping rule. For example, the predetermined mapping rule is that the CBs are mapped based on CB indexes and in order of a frequency domain prior to a time domain, or the predetermined mapping rule is that a to-be-mapped-onto frequency domain is divided into a plurality of sub-frequency domains and then the CBs are mapped in each sub-frequency domain.

According to the foregoing mapping rule, a TB may be divided into CBGs based on a time-frequency resource onto which the TB is mapped, for example, in a division manner of a time dimension, a frequency dimension, or time-frequency dimensions. In this manner, the plurality of CBGs obtained through division may have a same CB, or may not have a same CB. Whether the plurality of CBGs obtained through division have a same CB depends on a final resource mapping result described above.

Alternatively, CBs in a TB may be divided into a plurality of CBGs according to another rule (for example, a division manner un-related to a time-frequency resource onto which the TB is mapped but related to a quantity of bits of the transport block) or by using a signaling notification. In this manner, the plurality of CBGs obtained through division usually do not have a same CB.

A TB division manner is not limited in this application. The following uses two examples, and the two examples should not be construed as limitations on the TB division manner in this application.

TB Division Manner 1:

A first TB includes four CBs: a CB 1, a CB 2, a CB 3, and a CB 4. The first TB may be divided into two CBGs, namely, a CBG 1 and a CBG 2, according to the foregoing another rule or based on an indication of the higher layer signaling. The CBG 1 includes the CB 1 and the CB 2, and the CBG 2 includes the CB 3 and the CB 4.

A first TB includes eight CBs: a CB 1, a CB 2, a CB 3, a CB 4, a CB 5, a CB 6, a CB 7, and a CB 8. The first TB may be divided into two CBGs, namely, a CBG 1 and a CBG 2, according to the foregoing mapping rule or based on an indication of the higher layer signaling. The CBG 1 includes the CB 1, the CB 2, the CB 3, and the CB 4, and the CBG 2 includes the CB 5, the CB 6, the CB 7, and the CB 8.

A first TB includes eight CBs: a CB 1, a CB 2, a CB 3, a CB 4, a CB 5, a CB 6, a CB 7, and a CB 8. The first TB may be divided into four CBGs, namely, a CBG 1, a CBG 2, a CBG 3, and a CBG 4, according to the foregoing mapping rule or based on an indication of the higher layer signaling. The CBG 1 includes the CB 1 and the CB 2, the CBG 2 includes the CB 3 and the CB 4, the CBG 3 includes the CB 5 and the CB 6, and the CBG 4 includes the CB 7 and the CB 8.

Figure 2:
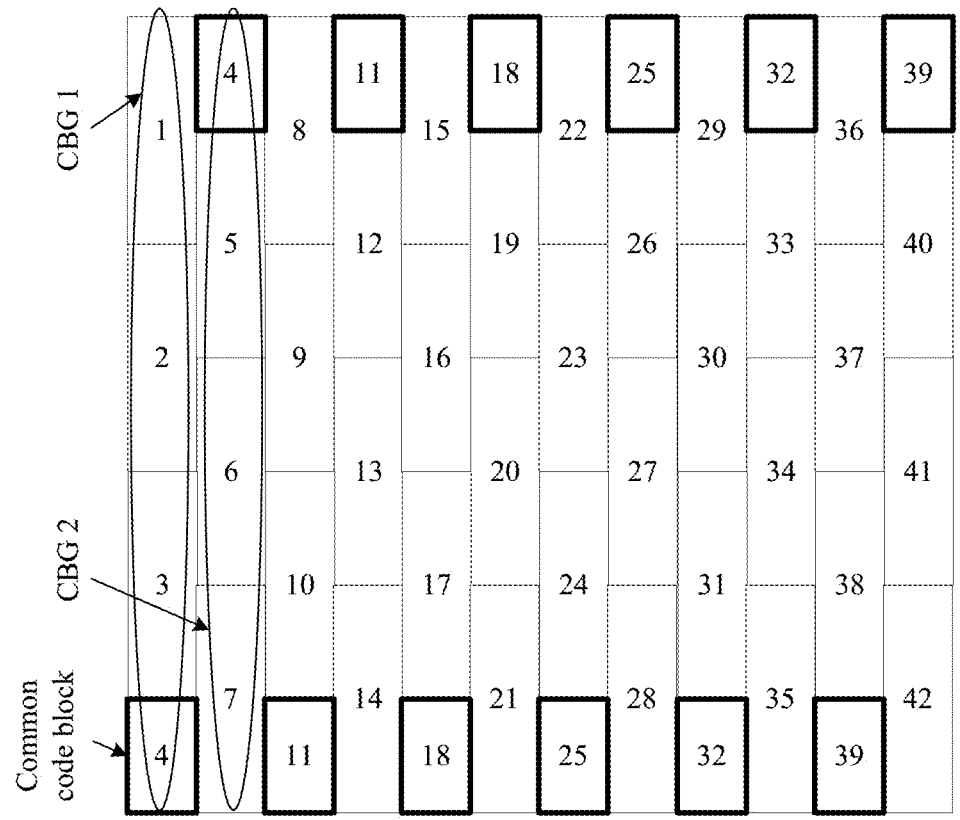
FIG. 2 is a schematic diagram of a code block group division method according to this application.

TB Division Manner 2:

FIG. 2 is a schematic diagram of a TB division manner according to this application. As shown in FIG. 2, a first TB includes 42 CBs that are mapped onto 12 time domain symbols in order of a frequency domain prior to a time domain, and the first TB is divided into 12 CBGs based on a dimension of the time domain symbols. Because frequency domain resources corresponding to a single time domain symbol are limited, some CBs cannot be all mapped onto a same time domain symbol. For example, a CBG 1 includes a CB 1 to a CB 4, a CBG 2 includes the CB 4 to a CB 7, and the CB 4 is a common CB of the CBG 1 and the CBG 2.

When a TB transmitted in the communications system is divided into a plurality of CBGs, a receive end may send feedback information to a transmit end based on a decoding status of each CBG. When a small quantity of CBGs are unsuccessfully decoded, the transmit end needs to retransmit only the unsuccessfully decoded CBGs, without a need to retransmit the entire TB. Therefore, resource utilization and data transmission efficiency are improved.

After determining, based on the received feedback information, that the TB is successfully transmitted, the transmit end may send a new TB to the receive end. For example, a base station may indicate, by using a hybrid automatic repeat request (hybrid automatic repeat request, HARQ) process number field and a new data indicator (new data indicator, NDI) field in scheduling information, whether current data transmission is initial transmission or retransmission. After a terminal device successively receives two pieces of scheduling information, if the two pieces of scheduling information carry a same HARQ process number field, and statuses of NDI fields carried in the two pieces of scheduling information are different, the terminal device may determine that a HARQ process scheduled by using the latter piece of scheduling information corresponds to transmission of new data; or if the two pieces of scheduling information carry a same HARQ process number field, and statuses of NDI fields carried in the two pieces of scheduling information are the same, the terminal device may determine that a HARQ process scheduled by using the latter piece of scheduling information corresponds to retransmission of old data. When data to be retransmitted is some CBGs of the TB, a new indicator field may be added to the scheduling information to indicate partial retransmission, or an existing field in the scheduling information may be reused to re-decipher a field, for example, re-decipher a modulation and coding scheme (modulation and coding scheme, MCS) field in the scheduling information. The foregoing method is merely used as an example for description, and this application is not limited thereto.

After receiving CBGs sent by the transmit end, the receive end decodes the CBGs. Successful decoding means that the receive end obtains all significant information bits included in the CBGs and the CBGs are successfully checked. A CBG check method is not limited in this application. In an optional example, the CBGs may be checked by using a cyclic redundancy check (cyclic redundancy check, CRC), or checked by using a preset check matrix corresponding to the CBGs. Unsuccessful decoding means that UE does not obtain all significant information bits included in the CBGs, or the UE obtains all the significant information bits included in the CBGs but the CBGs are unsuccessfully checked.

It should be noted that, for one TB, even if each CBG in the TB is successfully decoded, it should not be considered that the TB is successfully decoded. Therefore, after each CBG included in a TB is successfully decoded, the TB further needs to be checked. After the entire TB is successfully checked (for example, checked by using a TB CRC), it can be determined that the TB is successfully decoded.

After decoding the received CBGs, the receive end needs to feed back a decoding status of each CBG to the transmit end. The receive end may feed back a CBG decoding success state or a TB decoding success state by using a positive acknowledgement (acknowledge, ACK), and the receive end may feed back a CBG decoding failure state or a TB decoding failure state by using a negative acknowledgement (negative acknowledgement, NACK). The feedback information of each CBG may be one bit. A codebook size of all feedback information (namely, a feedback information set) sent by the receive end in a time unit is related to a quantity of the received CBGs. However, this does not mean that the codebook size of the feedback information set is equal to the quantity of the received CBGs. A codebook of the feedback information set may further include information about whether a TB passes a check, redundant information required for correctly decoding the TB, and/or the like.

The following describes in detail the feedback information sending method provided in this application.

FIG. 3 is a schematic flowchart of a feedback information sending method according to this application. The method 300 includes the following steps:

S310. A second device receives a first TB from a first device, where the first TB includes a plurality of CBGs, the plurality of CBGs include a first CBG and a second CBG that are received by the second device in a first time unit, the first CBG received in the first time unit is a CBG that is successfully decoded, and the second CBG received in the first time unit is a CBG that is unsuccessfully decoded.

S320. The second device generates a first feedback information set, where the first feedback information set includes first feedback information and second feedback information, the first feedback information is used to feed back a decoding status of the first CBG between the first time unit and a second time unit, the second feedback information is used to feed back a decoding status of the second CBG after the second time unit, the second time unit is a time unit in which the second device receives the second CBG after the first time unit, and the second device does not receive the first CBG in the second time unit.

S330. The second device sends the first feedback information set to the first device in a third time unit.

In the method 300, the second device may be a terminal device, or may be an access network device. When the second device is a terminal device, the first device is an access network device. When the first device is a terminal device, the second device is an access network device. For ease of understanding, the following describes the technical solutions of this application by using an example that the first device is a base station and the second device is UE.

The first TB is any TB sent by the first device to the second device. The first TB may be divided into a plurality of CBGs according to a predefined rule, and each CBG includes at least one CB. The first TB sent by the base station to the UE may be sent in one time unit, or may be sent in a plurality of time units. This is not limited in this application.

Correspondingly, the first CBG and the second CBG that are received by the UE in the first time unit may be all or some of the CBGs included in the first TB.

It should be understood that in this application, a length of one time unit may be set to any value. This is not limited in this application.

For example, one time unit may include one or more subframes.

Alternatively, one time unit may include one or more slots (slot) or mini-slots (mini-slot).

Alternatively, one time unit may include one or more time domain symbols.

Alternatively, one time unit may include one or more transmission time intervals (transmission time interval, TTI) or short transmission time intervals (short transmission time interval, sTTI).

Alternatively, a length of one time unit is 1 millisecond (ms).

Alternatively, a length of one time unit is less than 1 ms.

In addition, both a manner of transmitting the first TB and a resource used to transmit the first TB are not limited in this application. For example, the first TB may be transmitted in a grant-based (grant-based) manner, or may be transmitted in a grant-free (grant-free) manner; and a spectrum resource used to transmit the first TB may be a licensed spectrum, or may be an unlicensed spectrum or another shared spectrum.

After receiving the CBGs included in the first TB in the first time unit, the UE decodes the CBGs included in the first TB. The first CBG is a CBG that is successfully decoded, and the second CBG is a CBG that is unsuccessfully decoded. It should be understood that the first CBG may be one or more CBGs, and the second CBG may be one or more CBGs.

In an optional embodiment, the first feedback information is used to feed back a decoding status of the first CBG received in the first time unit. In another optional embodiment, the second feedback information is used to feed back a decoding status of the second CBG received in the second time unit.

In addition, in a URLLC scenario, the base station may continuously transmit CBGs K times without a need to wait for feedback from the UE, and the first time unit should be understood as a time unit used by the UE to receive the K transmissions.

For example, when K=3, and the CBGs received by the UE in the first time unit are CBGs transmitted by the base station three times, the first CBG may be a successfully decoded CBG that is determined by the UE after combining and decoding the CBGs transmitted by the base station three times, and the second CBG may be an unsuccessfully decoded CBG that is determined by the UE after combining and decoding the CBGs transmitted by the base station three times.

For the first CBG and the second CBG, the UE may feed back the decoding statuses only once, or may feed back the decoding statuses a plurality of times.

After receiving the feedback information sent by the UE for the first CBG and the second CBG, the base station determines to retransmit the second CBG but skip retransmitting the first CBG. After receiving the second CBG in the second time unit, the UE decodes the second CBG, then generates the second feedback information, and sends the first feedback information set including the second feedback information to the base station in the third time unit.

When the second CBG received by the UE in the second time unit is still unsuccessfully decoded, the second feedback information is a NACK. To ensure that the base station can identify a false alarm, that is, to ensure that the base station can identify whether the second feedback information indicates that the second CBG is unsuccessfully decoded or the first TB is unsuccessfully checked, the UE further needs to indicate the decoding status of the first CBG between the first time unit and the second time unit. To be specific, the first feedback information set needs to include both the first feedback information and the second feedback information.

In this application, the first feedback information includes two cases: an ACK or a NACK.

When the second CBG is successfully decoded between the second time unit and the third time unit, and the first TB is successfully checked between the second time unit and the third time unit, the decoding status of the first CBG between the first time unit and the second time unit is a successfully decoded state, that is, the first feedback information is an ACK.

When the second CBG is successfully decoded between the second time unit and the third time unit, and the first TB is unsuccessfully checked between the second time unit and the third time unit, it indicates that a decoding success state of the first CBG before the second time unit is actually inaccurate, or a decoding success state of the second CBG between the second time unit and the third time unit is actually inaccurate, or neither of the two states are actually accurate. In this case, a decoding and check false alarm occurs on at least one of the first CBG and the second CBG, and the decoding status of the first CBG between the first time unit and the second time unit should be a decoding failure state, that is, the first feedback information is a NACK.

When the second CBG is unsuccessfully decoded between the second time unit and the third time unit, the UE does not check the first TB; or the second CBG is unsuccessfully decoded, causing the first TB basically to fail to be checked, the UE temporarily considers that the decoding status of the first CBG between the first time unit and the second time unit is a decoding success state, that is, the first feedback information is an ACK.

For example, when the first feedback information is an ACK and the second feedback information is a NACK, the base station determines that the second CBG is unsuccessfully decoded, and the base station may retransmit only the second CBG after the third time unit, without a need to retransmit the entire first TB. Therefore, retransmission efficiency is improved.

For another example, when the first feedback information is an ACK and the second feedback information is an ACK, the base station determines that the second CBG is successfully decoded and the first TB is successfully decoded.

For still another example, when the first feedback information is a NACK and the second feedback information is a NACK, the base station determines that the first TB is unsuccessfully checked, and may retransmit the first TB after the third time unit.

It should be understood that in this application, "when", "if", and "in case" mean that the UE or the base station performs corresponding processing in an objective case, but are not intended to limit a time, do not require the UE or the base station to perform the determining action during implementation, and do not mean that there are other limitations.

The foregoing embodiment is merely used as an example for description, and this application is not limited thereto.

For example, when the base station does not receive the feedback information sent by the UE between the first time unit and the second time unit, the base station may retransmit the first CBG (briefly referred to as "first CBG retransmission"). When receiving the retransmitted first CBG before the second time unit, the UE may directly determine that the decoding status of the first CBG is an ACK. In this case, the first feedback information is still used to feed back the decoding status of the first CBG between the first time unit and the second time unit.

In addition, a specific manner of sending the first feedback information set by the UE is not limited in this application. The first feedback information set may be proactively sent by the UE, or may be sent by the UE based on trigger information (for example, collection information) sent by the base station.

In conclusion, according to the feedback information sending method provided in this application, a device that transmits a TB can identify a false alarm and a non-false alarm, thereby improving retransmission efficiency.

Optionally, the first feedback information includes at least one NACK, and the first feedback information is used to indicate that the first TB is unsuccessfully checked and each of the plurality of CBGs is successfully checked.

For example, first CBGs include three CBGs. When no false alarm occurs, the first feedback information is three ACKs; when a false alarm occurs, the first feedback information may be one NACK and two ACKs.

In this way, a device that transmits a TB can identify a false alarm and a non-false alarm, thereby improving retransmission efficiency.

Optionally, the at least one NACK has a one-to-one correspondence with the first CBG.

For example, first CBGs include three CBGs. When no false alarm occurs, the first feedback information is three ACKs; when a false alarm occurs, the first feedback information may be three NACKs.

In this way, a device that transmits a TB can identify a false alarm and a non-false alarm, thereby improving retransmission efficiency.

Optionally, the first feedback information includes an ACK that has a one-to-one correspondence with the first CBG; and the second CBG is unsuccessfully decoded between the second time unit and the third time unit; or the second CBG is successfully decoded between the second time unit and the third time unit, and the first TB is successfully checked.

In this way, a device that transmits a TB can identify a false alarm and a non-false alarm, thereby improving retransmission efficiency.

Optionally, the first feedback information set includes a plurality of ACKs that have a one-to-one correspondence with the plurality of CBGs, the first TB corresponds to a first transmission process, and the method 300 further includes the following steps:

S340. The second device receives collection information from the first device, where the collection information is used to instruct the second device to report feedback information of CBGs corresponding to at least one transmission process, and the at least one transmission process includes the first transmission process.

S350. The second device sends a second feedback information set corresponding to the first transmission process to the first device in a fourth time unit, where the second feedback information set includes a plurality of NACKs that have a one-to-one correspondence with the plurality of CBGs, and the second device does not receive, between the third time unit and the fourth time unit, CBGs corresponding to the first transmission process.

When the first feedback information set includes ACKs that have a one-to-one correspondence with the plurality of CBGs that belong to the first TB, it indicates that each of the plurality of CBGs is successfully decoded and the first TB is successfully checked. Then, the base station may send a new TB to the UE. The new TB corresponds to the first transmission process and/or a second transmission process, and the second transmission process is different from the first transmission process. Next, the base station collects feedback information of the first transmission process and the second transmission process from the UE.

The UE may not receive a TB corresponding to the first transmission process (for example, the base station does not schedule the first transmission process, or the base station schedules the first transmission process but the UE does not receive scheduling information). Therefore, when the base station sends the collection information to the UE to solicit feedback information of the CBG corresponding to the first transmission process, the UE erroneously considers that the base station collects feedback information of the first TB, and sends an ACK to the base station. Actually, the UE does not receive the new TB corresponding to the first transmission process. Consequently, a data transmission error is caused, subsequent higher layer retransmission is triggered, and retransmission efficiency is reduced.

To avoid the foregoing case, after the UE sends the first feedback information set that includes no NACK, when the UE receives the collection information, if the UE receives CBGs corresponding to the first transmission process, the UE performs feedback based on a decoding status; and if the UE does not receive CBGs corresponding to the first transmission process, the UE feeds back the plurality of NACKs that have a one-to-one correspondence with the plurality of CBGs corresponding to the first TB. The plurality of NACKs belong to the second feedback information set, and the second feedback information set may further include a process number of the first transmission process.

Therefore, according to the feedback information sending method provided in this application, when a receive end does not receive the CBG corresponding to the first transmission process, but receives the collection information for requiring feedback of the first transmission process, the receive end may feed back a plurality of NACKs, to avoid a data transmission error, and avoid a loss of a physical layer data packet caused due to that the receive end has missed detection of a control channel of the first transmission process but reports an ACK.

FIG. 4 is a schematic flowchart of another feedback information sending method according to this application. The method 400 includes the following steps:

S410. A second device receives a first TB from a first device, where the first TB includes a plurality of CBGs.

S420. The second device decodes each of the plurality of CBGs.

S430. The second device sends a third feedback information set to the first device, where the third feedback information set includes a plurality of NACKs that have a one-to-one correspondence with the plurality of CBGs, and the third feedback information set is used to indicate that the plurality of CBGs are successfully checked and the first TB is unsuccessfully checked.

In the method 400, the first device is, for example, a base station, and the second device is, for example, UE.

In S410, the plurality of CBGs may be CBGs received by the UE in one time unit, or may be CBGs received by the UE in a plurality of time units. A manner of transmitting the plurality of CBGs is not limited in this application. Results of decoding the plurality of CBGs include the following four cases:

Case 1: When each of the plurality of CBGs is successfully checked and the first TB is successfully checked, the UE sends a plurality of ACKs that have a one-to-one correspondence with the plurality of CBGs.

Case 2: When some of the plurality of CBGs are successfully checked, and some are unsuccessfully checked, the UE sends corresponding ACKs and NACKs.

Case 3: When all of the plurality of CBGs are unsuccessfully checked, the UE sends one NACK.

Case 4: When each of the plurality of CBGs is successfully checked but the first TB is unsuccessfully checked (namely, a false alarm), the UE sends a plurality of NACKs that have a one-to-one correspondence with the plurality of CBGs.

In S430, the third feedback information set may further include other information. In addition, the second device may automatically send the third feedback information set, or may send the third feedback information set based on trigger information sent by the first device.

In conclusion, according to the feedback information sending method provided in this application, a device that transmits a TB can identify a false alarm and a non-false alarm, thereby improving retransmission efficiency.

Optionally, the method 400 further includes the following steps:

S440. The second device receives the plurality of CBGs from the first device in a first time unit, where the plurality of CBGs include a first CBG and a second CBG, the first CBG received in the first time unit is a CBG that is successfully decoded, and the second CBG received in the first time unit is a CBG that is unsuccessfully decoded.

S450. The second device receives the second CBG from the first device in a second time unit, where the second device does not receive the first CBG in the second time unit.

S460. The second device generates a first feedback information set, where the first feedback information set includes first feedback information and second feedback information, the first feedback information is used to feed back a decoding status of the first CBG between the first time unit and the second time unit, and the second feedback information is used to feed back a decoding status of the second CBG after the second time unit.

S470. The second device sends the first feedback information set to the first device in a third time unit.

When the third information set includes a plurality of NACKs that have a one-to-one correspondence with the plurality of CBGs, the base station may retransmit the first TB based on the third information set. For a specific process, refer to a process in the method 300. The UE in the method 400 may be the same as the UE in the method 300. For brevity, details are not described herein again.

According to the feedback information sending method provided in this application, a device that transmits a TB can identify a false alarm and a non-false alarm, thereby improving retransmission efficiency.

Optionally, the first feedback information includes at least one NACK, and the first feedback information is used to indicate that the first TB is unsuccessfully checked and each of the plurality of CBGs is successfully checked.

In this way, a device that transmits a TB can identify a false alarm and a non-false alarm, thereby improving retransmission efficiency.

Optionally, the at least one NACK has a one-to-one correspondence with the first CBG In this way, a device that transmits a TB can identify a false alarm and a non-false alarm, thereby improving retransmission efficiency.

Optionally, the first feedback information includes an ACK that has a one-to-one correspondence with the first CBG; and the second CBG is unsuccessfully decoded between the second time unit and the third time unit; or the second CBG is successfully decoded between the second time unit and the third time unit, and the first TB is successfully checked.

In this way, a device that transmits a TB can identify a false alarm and a non-false alarm, thereby improving retransmission efficiency.

Optionally, the first feedback information set includes a plurality of ACKs that have a one-to-one correspondence with the plurality of CBGs, the first TB corresponds to a first transmission process, and the method 400 further includes the following steps:

S480. The second device receives collection information from the first device, where the collection information is used to instruct the second device to report feedback information of CBGs corresponding to at least one transmission process, and the at least one transmission process includes the first transmission process.

S490. The second device sends a second feedback information set corresponding to the first transmission process to the first device in a fourth time unit, where the second feedback information set includes a plurality of NACKs that have a one-to-one correspondence with the plurality of CBGs, and the second device does not receive, between the third time unit and the fourth time unit, CBGs corresponding to the first transmission process.

Therefore, according to the feedback information sending method provided in this application, when a receive end does not receive the CBG corresponding to the first transmission process, but receives the collection information for requiring feedback of the first transmission process, the receive end may feed back a plurality of NACKs, to avoid a data transmission error, and avoid a loss of a physical layer data packet caused due to that the receive end has missed detection of a control channel of the first transmission process but reports an ACK.

The foregoing describes the feedback information sending method provided in this application. The following describes, in detail with reference to accompanying drawings, a feedback information receiving method provided in this application.

FIG. 5 is a schematic flowchart of a feedback information receiving method according to this application. The method 500 includes the following steps:

S510. A first device sends a first TB to a second device in a fifth time unit, where the first TB includes a plurality of CBGs, the plurality of CBGs include a second CBG that is sent by the first device to the second device in a sixth time unit, the plurality of CBGs further include a first CBG that is not sent by the first device in the sixth time unit, the first CBG is a CBG that is determined by the first device based on feedback information received between the fifth time unit and the sixth time unit and that is successfully decoded by the second device, the second CBG is a CBG that is determined by the first device based on the feedback information received between the fifth time unit and the sixth time unit and that is unsuccessfully decoded by the second device, and the sixth time unit is after the fifth time unit.

S520. The first device receives a first feedback information set from the second device in a seventh time unit, where the first feedback information set includes first feedback information and second feedback information, the first feedback information is used to feed back a decoding status of the first CBG between the fifth time unit and the sixth time unit, the second feedback information is used to feed back a decoding status of the second CBG after the sixth time unit, and the seventh time unit is after the sixth time unit.

S530. The first device determines, based on the first feedback information set, whether to retransmit the first TB.

In the method 500, the first device is, for example, a base station, and the second device is, for example, UE.

The base station sends the first TB to the UE in the fifth time unit. In an optional example, when the first TB is sent in one TTI, the fifth time unit is equal to a time length of one TTI. When the first TB is sent in a plurality of TTIs, the fifth time unit is equal to a time length of the plurality of TTIs. In another optional example, the base station may continuously send the first TB K times. In this case, the fifth time unit should be understood as a time used for the K-time sending. A manner of sending the first TB in the fifth time unit by the base station is not limited in this application.

The base station receives feedback information of the first TB between the fifth time unit and the sixth time unit, and determines, based on the feedback information, that in the first TB, some CBGs (namely, the first CBG) are successfully decoded and some CBGs (namely, the second CBG) are unsuccessfully decoded.

The base station sends the second CBG to the UE in the sixth time unit, and no longer sends the first CBG Then, the base station receives, in the seventh time unit, the first feedback information set sent by the UE. The first feedback information set includes the first feedback information and the second feedback information. The first feedback information set in the method 500 may be the same as the first feedback information set in the method 300, and the base station in the method 500 may also be the same as the base station in the method 300. For brevity, details are not described herein again.

In this way, according to the feedback information sending method provided in this application, a device that transmits a TB can identify a false alarm and a non-false alarm, thereby improving retransmission efficiency.

Optionally, the first feedback information includes at least one NACK, and the first feedback information is used to indicate that the first TB is unsuccessfully checked and each of the plurality of CBGs is successfully checked.

For example, first CBGs include three CBGs. When no false alarm occurs, the first feedback information is three ACKs; when a false alarm occurs, the first feedback information may be one NACK and two ACKs.

In this way, a device that transmits a TB can identify a false alarm and a non-false alarm, thereby improving retransmission efficiency.

Optionally, the at least one NACK has a one-to-one correspondence with the first CBG In this way, a device that transmits a TB can identify a false alarm and a non-false alarm, thereby improving retransmission efficiency.

Optionally, the first feedback information includes an ACK that has a one-to-one correspondence with the first CBG; and the second CBG is unsuccessfully decoded between the second time unit and the third time unit; or the second CBG is successfully decoded between the second time unit and the third time unit, and the first TB is successfully checked.

In this way, a device that transmits a TB can identify a false alarm and a non-false alarm, thereby improving retransmission efficiency.

Optionally, the first feedback information set includes a plurality of ACKs that have a one-to-one correspondence with the plurality of CBGs, the first TB corresponds to a first transmission process, and the method 500 further includes the following steps:

S540. The first device sends a second TB to the second device, where the second TB includes at least one CBG, and the second TB corresponds to a second transmission process.

S550. The first device sends collection information to the second device, where the collection information is used to instruct the second device to report feedback information of CBGs corresponding to at least two transmission processes, and the at least two transmission processes include the first transmission process.

S560. The first device receives, from the second device in an eighth time unit, a second feedback information set corresponding to the first transmission process, where the second feedback information set includes a plurality of NACKs that have a one-to-one correspondence with the plurality of CBGs, and the first device does not schedule, for the second device between the seventh time unit and the eighth time unit, CBGs corresponding to the first transmission process.

When the first feedback information set includes ACKs that have a one-to-one correspondence with the plurality of CBGs that belong to the first TB, it indicates that each of the plurality of CBGs is successfully decoded and the first TB is successfully checked. Then, the base station may send a new TB to the UE. The new TB is, for example, the second TB. The second TB corresponds to the second transmission process, and the second transmission process is different from the first transmission process. Next, the base station collects feedback information from the UE.

When soliciting the feedback information, the base station may solicit feedback information of all transmission processes. Because the base station does not schedule the first transmission process, the base station receives a plurality of NACKs corresponding to the first transmission process, and the plurality of NACKs have a one-to-one correspondence with the plurality of CBGs included in the first TB. For a specific process, refer to the embodiment corresponding to S330 and S340. Details are not described herein again.

Therefore, according to the feedback information receiving method provided in this application, when a receive end does not receive the CBG corresponding to the first transmission process, but receives the collection information for requiring feedback of the first transmission process, the receive end may feed back a plurality of NACKs, to avoid a data transmission error, and avoid a loss of a physical layer data packet caused due to that the receive end has missed detection of a control channel of the first transmission process but reports an ACK.

Figure 6:
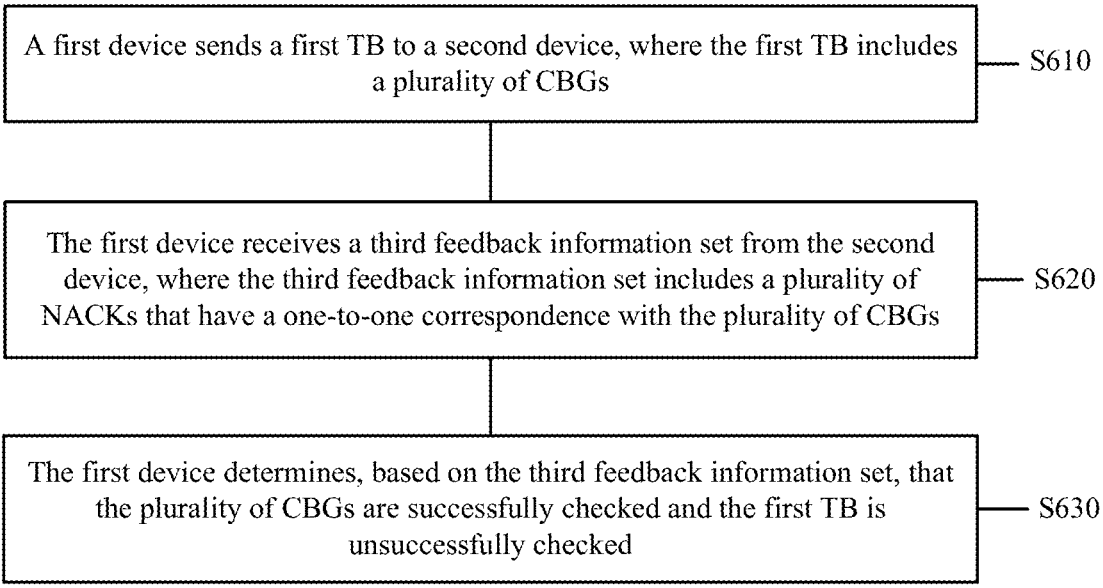
FIG. 6 is a schematic flowchart of another feedback information receiving method according to this application.

FIG. 6 is a schematic flowchart of another feedback information receiving method according to this application. The method 600 includes the following steps:

S610. A first device sends a first TB to a second device, where the first TB includes a plurality of CBGs.

S620. The first device receives a third feedback information set from the second device, where the third feedback information set includes a plurality of NACKs that have a one-to-one correspondence with the plurality of CBGs.

S630. The first device determines, based on the third feedback information set, that the plurality of CBGs are successfully checked and the first TB is unsuccessfully checked.

In the method 600, the first device is, for example, a base station, and the second device is, for example, UE.

In S620, results of decoding the plurality of CBGs include the following four cases:

Case 1: When each of the plurality of CBGs is successfully checked and the first TB is successfully checked, the third feedback information set includes a plurality of ACKs that have a one-to-one correspondence with the plurality of CBGs.

Case 2: When some of the plurality of CBGs are successfully checked, and some are unsuccessfully checked, the third feedback information set includes corresponding ACKs and NACKs.

Case 3: When all of the plurality of CBGs are unsuccessfully checked, the third feedback information set includes one NACK.

Case 4: When each of the plurality of CBGs is successfully checked but the first TB is unsuccessfully checked (namely, a false alarm), the third feedback information set includes a plurality of NACKs that have a one-to-one correspondence with the plurality of CBGs.

In S630, the third feedback information set may further include other information. In addition, the second device may automatically send the third information set, or may send the third information set based on trigger information sent by the first device.

In conclusion, according to the feedback information sending method provided in this application, a device that transmits a TB can identify a false alarm and a non-false alarm, thereby improving retransmission efficiency.

Optionally, the method 600 further includes the following steps:

S640. The first device sends the plurality of CBGs to the second device in a fifth time unit.

S650. The first device sends a second CBG to the second device in a sixth time unit, where the second CBG belongs to the plurality of CBGs, and the second CBG is a CBG that is determined by the first device based on feedback information received between the fifth time unit and the sixth time unit and that is unsuccessfully decoded by the second device; the plurality of CBGs further include a first CBG, and the first CBG is a CBG that is determined by the first device based on the feedback information received between the fifth time unit and the sixth time unit and that is successfully decoded by the second device; and the first device does not send the first CBG in the sixth time unit.

S660. The first device receives a first feedback information set from the second device in a seventh time unit, where the first feedback information set includes first feedback information and second feedback information, the first feedback information is used to feed back a decoding status of the first CBG between the fifth time unit and the sixth time unit, and the second feedback information is used to feed back a decoding status of the second CBG between the sixth time unit and the seventh time unit.

When the third information set includes a plurality of NACKs that have a one-to-one correspondence with the plurality of CBGs, the base station may retransmit the first TB based on the third information set. For a specific process, refer to a process in the method 300. The base station in the method 600 may be the same as the base station in the method 300. For brevity, details are not described herein again.

According to the feedback information sending method provided in this application, a device that transmits a TB can identify a false alarm and a non-false alarm, thereby improving retransmission efficiency.

Optionally, the first feedback information includes at least one NACK, and the first feedback information is used to indicate that the first TB is unsuccessfully checked and each of the plurality of CBGs is successfully checked.

In this way, a device that transmits a TB can identify a false alarm and a non-false alarm, thereby improving retransmission efficiency.

Optionally, the at least one NACK has a one-to-one correspondence with the first CBG In this way, a device that transmits a TB can identify a false alarm and a non-false alarm, thereby improving retransmission efficiency.

Optionally, the first feedback information includes an ACK that has a one-to-one correspondence with the first CBG; and the second CBG is unsuccessfully decoded between the second time unit and the third time unit; or the second CBG is successfully decoded between the second time unit and the third time unit, and the first TB is successfully checked.

In this way, a device that transmits a TB can identify a false alarm and a non-false alarm, thereby improving retransmission efficiency.

Optionally, the first feedback information set includes a plurality of ACKs that have a one-to-one correspondence with the plurality of CBGs, the first TB corresponds to a first transmission process, and the method 600 further includes the following steps:

S670. The first device sends a second TB to the second device, where the second TB includes at least one CBG, and the second TB corresponds to a second transmission process.

S680. The first device sends collection information to the second device, where the collection information is used to instruct the second device to report feedback information of CBGs corresponding to at least two transmission processes, and the at least two transmission processes include the first transmission process.

S690. The first device receives, from the second device in an eighth time unit, a second feedback information set corresponding to the first transmission process, where the second feedback information set includes a plurality of NACKs that have a one-to-one correspondence with the plurality of CBGs, and the first device does not schedule, for the second device between the seventh time unit and the eighth time unit, a CBG corresponding to the first transmission process.

When the first feedback information set includes ACKs that have a one-to-one correspondence with the plurality of CBGs that belong to the first TB, it indicates that each of the plurality of CBGs is successfully decoded and the first TB is successfully checked. Then, the base station may send a new TB to the UE. The new TB is, for example, the second TB. The second TB corresponds to the second transmission process, and the second transmission process is different from the first transmission process. Next, the base station collects feedback information from the UE.

When soliciting the feedback information, the base station may solicit feedback information of all transmission processes. The base station does not schedule the first transmission process. Therefore, the base station receives a plurality of NACKs corresponding to the first transmission process, and the plurality of NACKs have a one-to-one correspondence with the plurality of CBGs included in the first TB. For a specific process, refer to the embodiment corresponding to S330 and S340. Details are not described herein again.

Therefore, according to the feedback information receiving method provided in this application, when a receive end does not receive the CBG corresponding to the first transmission process, but receives the collection information for requiring feedback of the first transmission process, the receive end may feed back a plurality of NACKs, to avoid a data transmission error, and avoid a loss of a physical layer data packet caused due to that the receive end has missed detection of a control channel of the first transmission process but reports an ACK.

The foregoing describes in detail examples of the feedback information sending method and the feedback information receiving method according to this application. It may be understood that, to implement the foregoing functions, the terminal device and the access network device include corresponding hardware structures and/or software modules for performing the functions. A person skilled in the art should easily be aware that, in combination with units and algorithm steps in the examples described in the embodiments disclosed in this specification, this application may be implemented by hardware or a combination of hardware and computer software. Whether a function is performed by hardware or by hardware driven by computer software depends on particular applications and design constraints of the technical solutions. A person skilled in the art may use different methods to implement the described functions for each particular application, but it should not be considered that the implementation goes beyond the scope of this application.

In this application, the terminal device and the like may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that the unit division in this application is an example, and is merely logical function division and may be performed in another division manner in actual implementation.

Figure 7:
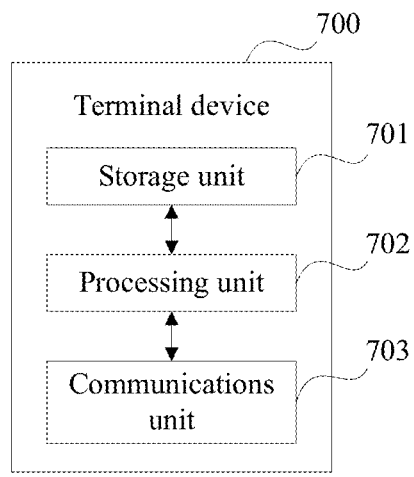
FIG. 7 is a schematic structural diagram of a possible terminal device according to this application.

When the integrated unit is used, FIG. 7 is a possible schematic structural diagram of a terminal device according to the foregoing embodiment. The terminal device 700 includes a processing unit 702 and a communications unit 703. The processing unit 702 is configured to control and manage actions of the terminal device 700. For example, the processing unit 702 is configured to support the terminal device 700 in performing S320 and/or configured to perform other processes of technologies described in this specification. The communications unit 703 is configured to support communication between the terminal device 700 and another network entity, for example, communication between the terminal device 700 and an access network device. The terminal device 700 may further include a storage unit 701, configured to store program code and data of the terminal device 700.

The processing unit 702 may be a processor or a controller, for example, may be a central processing unit (central processing unit, CPU), a general purpose processor, a digital signal processor (digital signal processor, DSP), an application-specific integrated circuit (application-specific integrated circuit, ASIC), a field programmable gate array (field programmable gate array, FPGA), or another programmable logical device, a transistor logical device, a hardware component, or a combination thereof. The processing unit 702 may implement or perform various example logical blocks, modules, and circuits described with reference to content disclosed in this application. Alternatively, the processing unit 702 may be a combination of processors implementing a computing function, for example, a combination of one or more microprocessors, or a combination of the DSP and a microprocessor. The communications unit 703 may be a transceiver, a transceiver circuit, or the like. The storage unit 701 may be a memory.

According to the terminal device 700 provided in this application, a device that transmits a TB can identify a false alarm and a non-false alarm, thereby improving retransmission efficiency.

Figure 8:
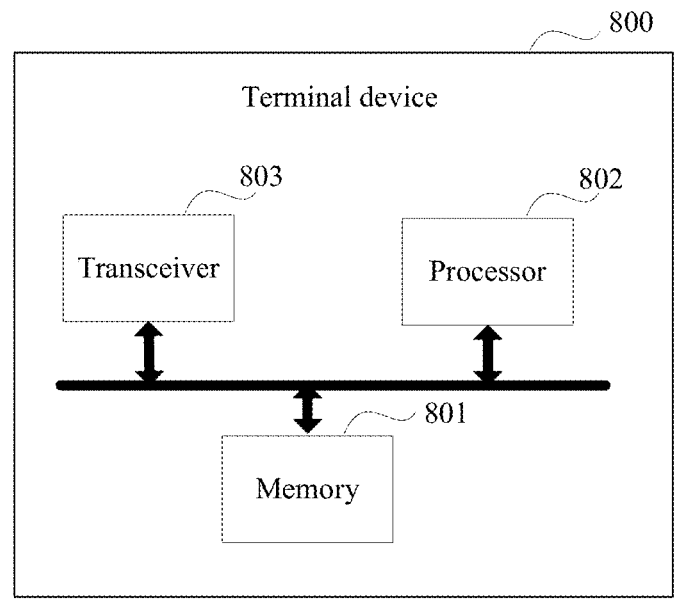
FIG. 8 is a schematic structural diagram of another possible terminal device according to this application.

When the processing unit 702 is a processor, the communications unit 703 is a transceiver, and the storage unit 701 is a memory, the terminal device in this application may be a terminal device shown in FIG. 8.

Referring to FIG. 8, the terminal device 800 includes a processor 802, a transceiver 803, and a memory 801. The transceiver 803, the processor 802, and the memory 801 may communicate with each other by using an internal connection path, to transfer a control signal and/or a data signal.

It may be clearly understood by a person skilled in the art that, for the purpose of convenient and brief description, for a detailed working process of the foregoing device and unit, refer to a corresponding process in the foregoing method embodiments. Details are not described herein again.

According to the terminal device 800 provided in this application, a device that transmits a TB can identify a false alarm and a non-false alarm, thereby improving retransmission efficiency.

Figure 9:
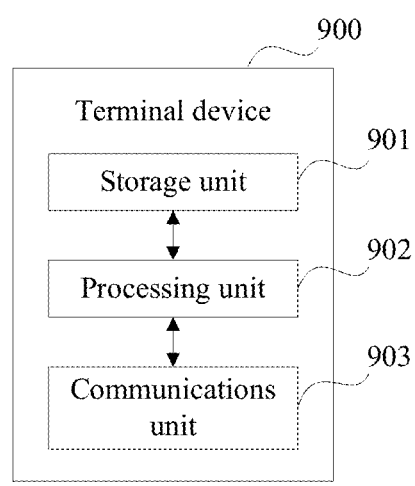
FIG. 9 is a schematic structural diagram of still another possible terminal device according to this application.

When the integrated unit is used, FIG. 9 is a possible schematic structural diagram of a terminal device according to the foregoing embodiment. The terminal device 900 includes a processing unit 902 and a communications unit 903. The processing unit 902 is configured to control and manage actions of the terminal device 900. For example, the processing unit 902 is configured to support the terminal device 900 in performing S420 and/or configured to perform other processes of technologies described in this specification. The communications unit 903 is configured to support communication between the terminal device 900 and another network entity, for example, communication between the terminal device 900 and an access network device. The terminal device 900 may further include a storage unit 901, configured to store program code and data of the terminal device 900.

The processing unit 902 may be a processor or a controller, for example, may be a CPU, a general purpose processor, a DSP, an ASIC, an FPGA, or another programmable logic device, a transistor logic device, a hardware component, or any combination thereof. The processing unit 902 may implement or perform various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications unit 903 may be a transceiver, a transceiver circuit, or the like. The storage unit 901 may be a memory.

According to the terminal device 900 provided in this application, a device that transmits a TB can identify a false alarm and a non-false alarm, thereby improving retransmission efficiency.

Figure 10:
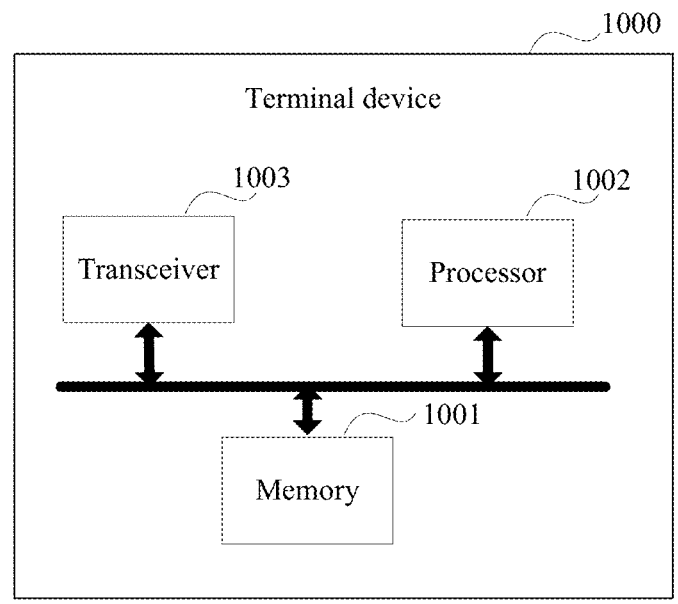
FIG. 10 is a schematic structural diagram of yet another possible terminal device according to this application.

When the processing unit 902 is a processor, the communications unit 903 is a transceiver, and the storage unit 901 is a memory, the terminal device in this application may be a terminal device shown in FIG. 10.

Referring to FIG. 10, the terminal device 1000 includes a processor 1002, a transceiver 1003, and a memory 1001. The transceiver 1003, the processor 1002, and the memory 1001 may communicate with each other by using an internal connection path, to transfer a control signal and/or a data signal.

It may be clearly understood by a person skilled in the art that, for the purpose of convenient and brief description, for a detailed working process of the foregoing device and unit, refer to a corresponding process in the foregoing method embodiments. Details are not described herein again.

According to the terminal device 1000 provided in this application, a device that transmits a TB can identify a false alarm and a non-false alarm, thereby improving retransmission efficiency.

Figure 11:
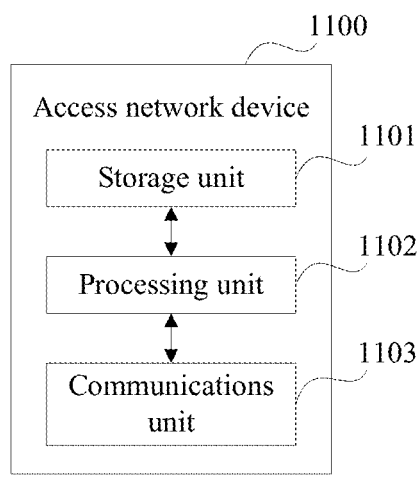
FIG. 11 is a schematic structural diagram of a possible access network device according to this application.

When the integrated unit is used, FIG. 11 is a possible schematic structural diagram of an access network device according to the foregoing embodiment. The access network device 1100 includes a processing unit 1102 and a communications unit 1103. The processing unit 1102 is configured to control and manage actions of the access network device 1100. For example, the processing unit 1102 is configured to support the access network device 1100 in performing S530 and/or configured to perform other processes of technologies described in this specification. The communications unit 1103 is configured to: support communication between the access network device 1100 and another network entity, for example, communication between the access network device 1100 and a terminal device, and perform a step such as S510. The access network device 1100 may further include a storage unit 1101, configured to store program code and data of the access network device 1100.

The processing unit 1102 may be a processor or a controller, for example, may be a CPU, a general purpose processor, a DSP, an ASIC, an FPGA, or another programmable logic device, a transistor logic device, a hardware component, or any combination thereof. The processing unit 1102 may implement or perform various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications unit 1103 may be a transceiver, a transceiver circuit, or the like. The storage unit 1101 may be a memory.

According to the access network device 1100 for data transmission provided in this application, a device that transmits a TB can identify a false alarm and a non-false alarm, thereby improving retransmission efficiency.

Figure 12:
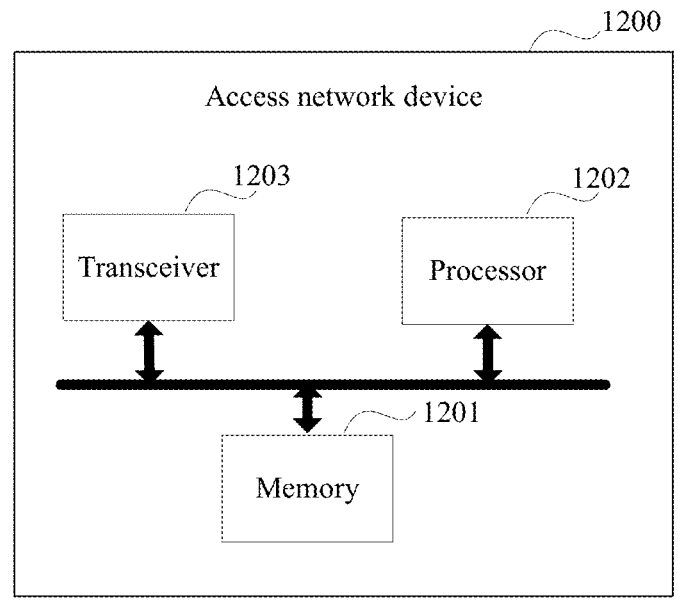
FIG. 12 is a schematic structural diagram of another possible access network device according to this application.

When the processing unit 1102 is a processor, the communications unit 1103 is a transceiver, and the storage unit 1101 is a memory, the access network device in this application may be an access network device shown in FIG. 12.

Referring to FIG. 12, the access network device 1200 includes a processor 1202, a transceiver 1203, and a memory 1201. The transceiver 1203, the processor 1202, and the memory 1201 may communicate with each other by using an internal connection path, to transfer a control signal and/or a data signal.

It may be clearly understood by a person skilled in the art that, for the purpose of convenient and brief description, for a detailed working process of the foregoing device and unit, refer to a corresponding process in the foregoing method embodiments. Details are not described herein again.

According to the access network device 1200 for data transmission provided in this application, a device that transmits a TB can identify a false alarm and a non-false alarm, thereby improving retransmission efficiency.

Figure 13:
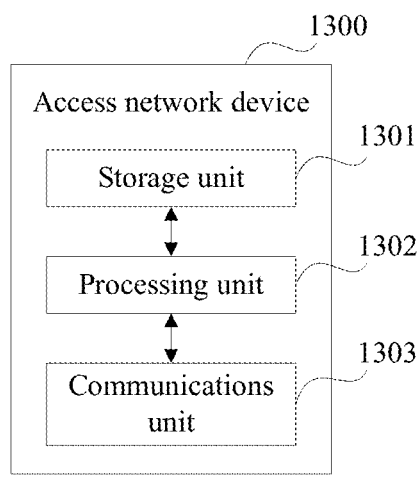
FIG. 13 is a schematic structural diagram of still another possible access network device according to this application.

When the integrated unit is used, FIG. 13 is a possible schematic structural diagram of an access network device according to the foregoing embodiment. The access network device 1300 includes a processing unit 1302 and a communications unit 1303. The processing unit 1302 is configured to control and manage actions of the access network device 1300. For example, the processing unit 1302 is configured to support the access network device 1300 in performing S630 and/or configured to perform other processes of technologies described in this specification. The communications unit 1303 is configured to: support communication between the access network device 1300 and another network entity, for example, communication between the access network device 1300 and a terminal device, and perform a step such as S610. The access network device 1300 may further include a storage unit 1301, configured to store program code and data of the access network device 1300.

The processing unit 1302 may be a processor or a controller, for example, may be a CPU, a general purpose processor, a DSP, an ASIC, an FPGA, or another programmable logic device, a transistor logic device, a hardware component, or any combination thereof. The processing unit 1302 may implement or perform various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications unit 1303 may be a transceiver, a transceiver circuit, or the like. The storage unit 1301 may be a memory.

According to the access network device 1300 for data transmission provided in this application, a device that transmits a TB can identify a false alarm and a non-false alarm, thereby improving retransmission efficiency.

Figure 14:
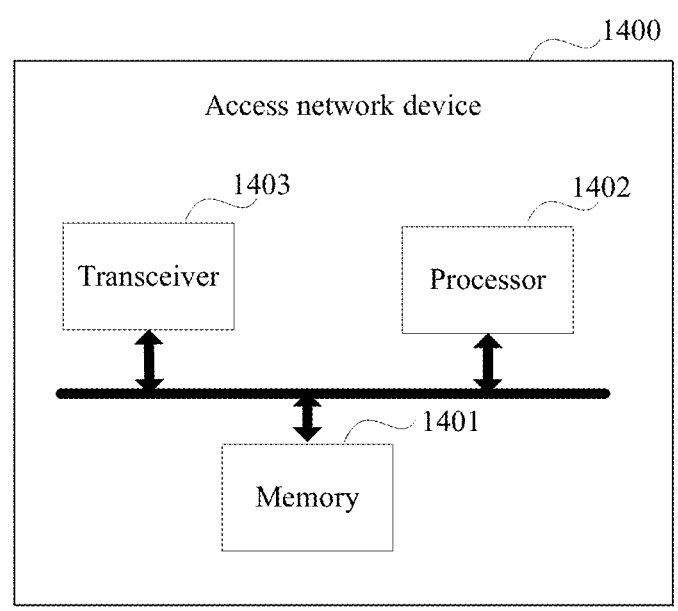
FIG. 14 is a schematic structural diagram of yet another possible access network device according to this application.

When the processing unit 1302 is a processor, the communications unit 1303 is a transceiver, and the storage unit 1301 is a memory, the access network device in this application may be an access network device shown in FIG. 14.

Referring to FIG. 14, the access network device 1400 includes a processor 1402, a transceiver 1403, and a memory 1401. The transceiver 1403, the processor 1402, and the memory 1401 may communicate with each other by using an internal connection path, to transfer a control signal and/or a data signal.

It may be clearly understood by a person skilled in the art that, for the purpose of convenient and brief description, for a detailed working process of the foregoing device and unit, refer to a corresponding process in the foregoing method embodiments. Details are not described herein again.

According to the access network device 1400 for data transmission provided in this application, a device that transmits a TB can identify a false alarm and a non-false alarm, thereby improving retransmission efficiency.

It should be understood that sequence numbers of the foregoing processes do not mean execution sequences in the embodiments of this application. The execution sequences of the processes should be determined based on functions and internal logic of the processes, and should not be construed as any limitation on the implementation processes of this application.

In addition, the term "and/or" in this specification describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

Method or algorithm steps described in combination with the content disclosed in this application may be implemented by hardware, or may be implemented by a processor by executing a software instruction. The software instruction may include a corresponding software module. The software module may be stored in a random access memory (random access memory, RAM), a flash memory, a read only memory (read only memory, ROM), an erasable programmable read only memory (erasable programmable ROM, EPROM), an electrically erasable programmable read only memory (electrically EPROM, EEPROM), a register, a hard disk, a removable hard disk, a compact disc read only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the terminal device. Certainly, the processor and the storage medium may exist in the terminal device and the access network device as discrete components.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions are generated according to this application. The computer may be a general purpose computer, a special-purpose computer, a computer network, or another programmable apparatus. The computer instructions may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a solid state disk (solid state disk, SSD)), or the like.

The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement, improvement, or the like made based on the technical solutions of this application shall fall within the protection scope of this application.

What is claimed is:

1. A wireless communication method for feeding back information, the method comprising: receiving, by a terminal device during a first time period, a transport block (TB)

from a network device, wherein the TB comprises a plurality of code block groups (CBGs); decoding, by the terminal device, the plurality of CBGs, wherein one or more CBGs in the plurality of CBGs are correctly decoded and one or more CBGs in the plurality of CBGs are incorrectly decoded; receiving, by the terminal device during a second time period after the first time period, one or more retransmissions comprising the one or more CBGs that are incorrectly decoded and absent the one or more CBGs that are correctly decoded; decoding, by the terminal device, the one or more retransmissions, and sending, by the terminal device during a third time period after the second time period, first feedback information, wherein the first feedback information comprise one or more first decoding statuses respectively corresponding to one or more CBGs that are correctly decoded and one or more second decoding statuses respectively corresponding to the one or more retransmissions, wherein the one or more first decoding statuses are one or more decoding success states represented by one or more positive acknowledgements (ACKs), in response to at least one of the one or more retransmissions is incorrectly decoded, wherein the one or more first decoding statuses and the one or more second decoding statuses are decoding failure states represented by negative acknowledgements (NACKs), in response to all of the one or more retransmissions are correctly decoded and the TB is incorrectly decoded, and wherein the one or more first decoding statuses and the one or more second decoding statuses are decoding success states represented by ACKs, in response to determining that all of the one or more retransmissions are correctly decoded and the TB is correctly decoded.

2. The method of claim 1, wherein in response to at least one of the one or more retransmissions is incorrectly decoded, the one or more second decoding statuses comprise at least one decoding failure state represented by at least one negative acknowledgement (NACK).

3. The method of claim 2, wherein the one or more second decoding statuses comprise one or more decoding success states represented by one or more ACKs corresponding to a remainder of the one or more retransmissions other than the at least one of the one or more retransmissions that is incorrectly decoded.

4. The method of claim 1, wherein the one or more first decoding statuses and the one or more second decoding statuses are decoding success states represented by ACKs, in response to all of the one or more retransmissions are correctly decoded and the TB is correctly decoded, the TB is decoded based on cyclic redundancy check.

5. An apparatus, comprising: at least one processor, a memory coupled to the at least one processor and storing programming instructions for execution by the at least one processor, the programming instructions instruct the at least one processor to: receive, during a first time period, a transport block (TB) from a network device, wherein the TB comprises a plurality of code block groups (CBGs); decoding, the plurality of CBGs, wherein one or more CBGs in the plurality of CBGs are correctly decoded and one or more CBGs in the plurality of CBGs are incorrectly decoded; receive, during a second time period after the first time period, one or more retransmissions comprising the one or more CBGs that are incorrectly decoded and absent the one or more CBGs that are correctly decoded; decoding, the one or more retransmission and send, during a third time period after the second time period, first feedback information, wherein the first feedback information comprise one or more first decoding statuses respectively corresponding to one or more CBGs that are correctly decoded and second one or more decoding statuses respectively corresponding to the one or more retransmissions wherein the one or more first decoding statuses are one or more decoding success states represented by one or more positive acknowledgements (ACKs), in response to at least one of the one or more retransmissions is incorrectly decoded, wherein the one or more first decoding statuses and the one or more second decoding statuses are decoding failure states represented by negative acknowledgements (NACKs), in response to all of the one or more retransmissions are correctly decoded and the TB is incorrectly decoded, and wherein the one or more first decoding statuses and the one or more second decoding statuses are decoding success states represented by ACKs, in response to all of the one or more retransmissions are correctly decoded and the TB is correctly decoded.

6. The apparatus of claim 5, wherein the one or more first decoding statuses are one or more decoding success states represented by one or more positive acknowledgements (ACKs), in response to at least one of the one or more retransmissions is incorrectly decoded, and the one or more second decoding statuses comprise at least one decoding failure state represented by at least one negative acknowledgement (NACK) in response to at least one of the one or more retransmissions is incorrectly decoded.

7. The apparatus of claim 6, wherein the one or more second decoding statuses comprise one or more decoding success states represented by one or more ACKs corresponding to a remainder of the one or more retransmissions other than the at least one of the one or more retransmissions that is incorrectly decoded.

* * * * *